United States Patent [19]

Parandes

[11] Patent Number: 4,473,177
[45] Date of Patent: Sep. 25, 1984

[54] NOVEL CAMERA CARRYING DEVICE

[76] Inventor: Dana J. Parandes, 61 Forrest Hill Dr., Bethlehem, Pa. 18015

[21] Appl. No.: 510,619

[22] Filed: Jul. 5, 1983

[51] Int. Cl.³ ............................................. G03B 17/56
[52] U.S. Cl. .................................. 224/191; 224/908; 354/293
[58] Field of Search ............... 224/191, 908; 354/293, 354/294, 81, 82; 248/184, 186

[56] References Cited

U.S. PATENT DOCUMENTS

| 3,870,209 | 3/1975 | Mazur | 224/908 X |
| 3,984,855 | 10/1976 | Baczynsky | 354/293 |
| 4,058,242 | 11/1977 | Brewer | 224/908 X |
| 4,341,452 | 7/1982 | Korling | 354/293 |

*Primary Examiner*—Steven M. Pollard
*Attorney, Agent, or Firm*—Joseph W. Molasky & Assoc.

[57] ABSTRACT

A camera carrying apparatus which holds two cameras simultaneously one above the other. Alternatively, two or more of the subject devices may be joined together in a tandem-like arrangement to provide enhanced camera carrying capabilities.

10 Claims, 5 Drawing Figures

NOVEL CAMERA CARRYING DEVICE

This invention relates to an apparatus which holds two cameras on a single strap one beneath the other. This allows the user to choose quickly between either camera and interchange back and forth, a feature which can be particularly useful when one camera contains color film and the other black and white.

BACKGROUND

Camera cases cover the entire camera and they are usually made of a stiff material such as leather. Accordingly, when it becomes necessary to load, unload or operate said camera the removal of said case can be an adventure which results in awkward delays and which can lead ultimately to a lost photo opportunity. This problem is even more acute when two cameras are jointly used.

It is not uncommon for photographers to use more than one camera during picture-taking sessions. One may contain a specialty lens or a high speed color film for taking action photos while another may be equipped with black and white film for still photographs.

In such instances it is desirable to have on hand several cameras so that the photographer can use one or the other camera without having to remove the case in which they are housed.

There are presently available several types of dual-camera holders but they are neither compact or uncomplicated and, therefore, no one of them has gained widespread acceptance.

For these reasons, I describe herein a novel camera-carrying apparatus which is both unobtrusive and easy to use.

More specifically, it is an object of this invention to provide an apparatus which conveniently holds several cameras in tandem so that they may be used quickly or in rapid succession.

It is a further object to provide means for releasably securing a camera to said apparatus and thus minimizing the risk of loss due to theft or negligence.

Another object provides means for securing various camera-related equipment to said apparatus as, for example, a lens mount or the like.

Still another object relates to the joining of said apparatus to a second identical apparatus so as to provide a tandem device having enhanced camera-carrying capability.

These and other objects are more fully described in the following description.

THE INVENTION

Broadly stated, this invention relates to a rectangularly shaped device comprised of two identical baseplates joined to one another at their respective end portions by connecting members of lesser dimension. Each baseplate may be attached to a camera bottom via a thumb screw which engages the tripod nut associated with tripod mounts.

Specifically, this invention relates to a camera carrier having a rectangularly shaped open body in which the top and bottom portions thereof are identical. Said body comprises:
  (1) two facing baseplates both of which are adapted for attachment to the bottom of a camera and each having an outer surface and an inner surface;
  (2) two slotted connecting members which face one another and which join said baseplates at their respective end portions; and
  (3) means for releasably securing said baseplates to said camera.

The means employed for securing said baseplates to said camera consists essentially of a threaded screw which is movably mounted within a slot in each baseplate. The threaded portion of said screw extends beyond said baseplate as a result of which it may be threadably engaged with the tripod nut in the camera base.

The threaded screw contains an enlarged head portion which is knurled so that it may be turned easily for connection with the tripod nut and the camera base. Joining the head and the threaded portion is a smooth shank of reduced diameter which allows said screw to slide easily within the baseplate opening.

A circular rigid washer interposed between said head and said baseplate surrounds the shank and permits the screw to slide easily within said opening.

To ensure that the camera is securely held in place and avoid damaging its finish the exposed upper surfaces of said baseplates, that is, those surfaces which come into contact with the camera base, may be covered with a resilient material. Synthetic materials such as polyurethane may be employed but, preferably, it is most desirable to use a layer of natural rubber.

A second embodiment of this invention consists of joining together two or more of the herein-described camera holders in a side-by-side relationship so as to increase their camera-carrying capabilities. According to this embodiment two individual camera holders are joined through their respective slotted openings in the side connector members via a threaded bolt and an accommodating nut.

In its camera-carrying mode the present device lies suspended from the neck of the operator by a strap adfixed to a camera which is held by the camera-carrying device of this invention.

These and other features will be apparent from the accompanying Drawings; however, it will be appreciated by those skilled in this art that said Drawings are illustrative only and they are capable of side variation and modification without departing from the spirit or scope of this invention. Thus, for example, the present device is herein-identified as a camera-carrier or camera-holder but the artisan will understand that it may also be used to carry or hold any photographic equipment which contains a tripod nut as, for example, a lens mount or the like.

This invention will now be described with particularity by reference to the accompanying Drawings.

THE DRAWINGS

This invention is illustrated hereinbelow by reference to the Drawings and precise embodiments.

PREFERRED EMBODIMENTS

Figure 1:
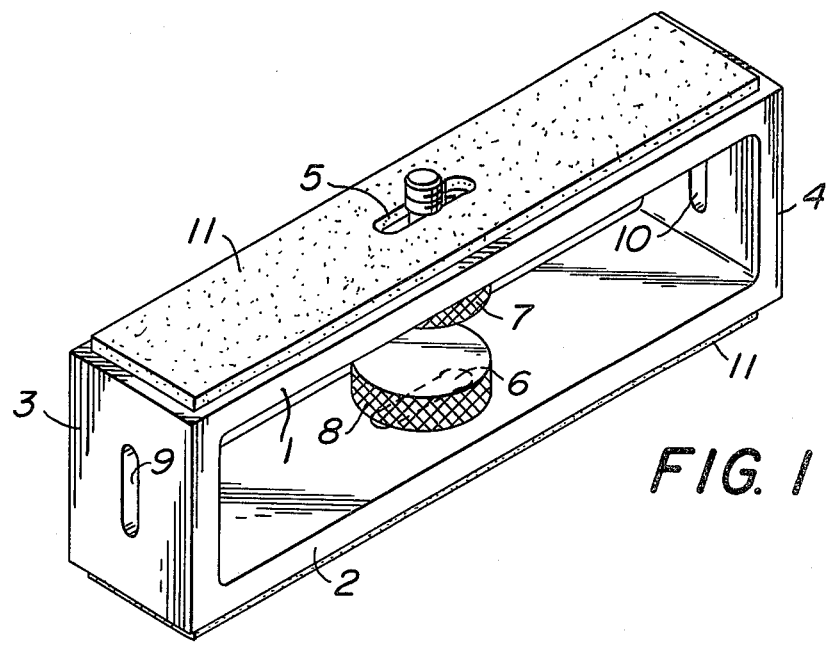
FIG. 1 is a perspective view of the camera carrying apparatus of this invention.
Figure 2:
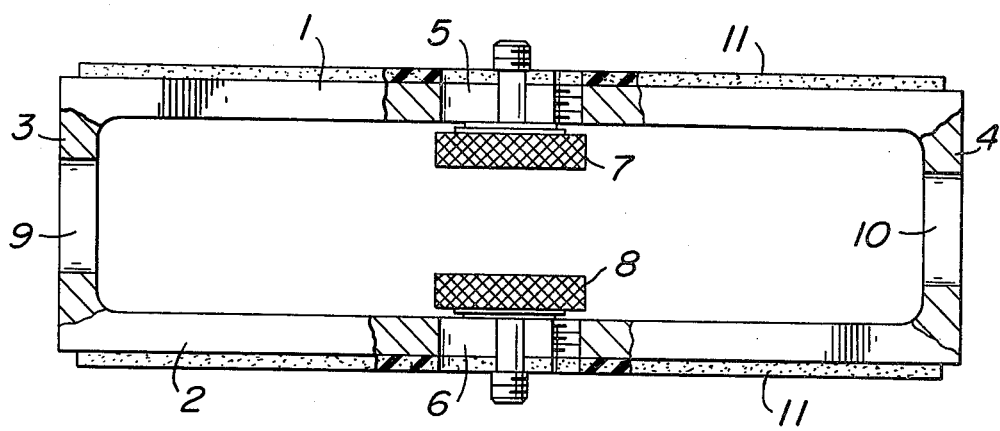
FIG. 2 is a front view of FIG. 1.

The device of this invention is shown in FIGS. 1 and 2. It consists essentially of two facing baseplates 1 and 2 joined to one another at their end portions by connecting members 3 and 4. The baseplate openings 5 and 6 provide apertures through which screw assemblies 7 and 8 are brought into threaded engagement with a camera base 16 (FIG. 3) or with photographic equipment so as to securely hold them in place. To protect the attached camera or equipment and preserve their finish a layer of resilient material 11 such as rubber is adfixed to the outer surface of each baseplate to provide a cushioning effect.

Figure 3:
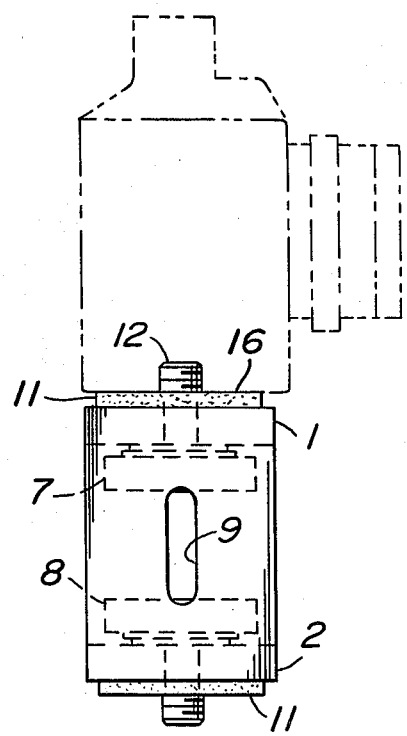
FIG. 3 is an end view of FIG. 2. A camera is shown in phantom to illustrate its attachment to said apparatus.

The device is operated by engaging the threaded portion 12 of the screw assembly 7 with the tripod nut of a camera as shown in phantom in FIG. 3. A strap (not shown) attached to said camera is then placed around the user's neck and, when a picture is to be taken, the camera is simply raised to eye level in the customary manner with the device attached. If a second camera is to be used it is secured to baseplate 2 via screw assembly 8 and operated by raising the device to eye level while rotating it 180 degrees. Alternatively, in lieu of a camera, there may be secured to the said device any photographic accessory which is equipped with a tripod nut which can be attached in an identical manner.

Figure 4:
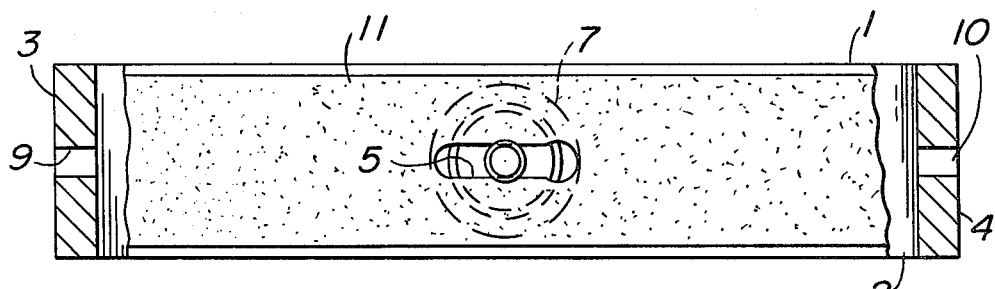
FIG. 4 is a top view of FIG. 2.

The camera carrying capabilities of the present device can also be enhanced by joining two or more of them together in a tandem-type arrangement. According to this embodiment a threaded bolt (not shown) is inserted through opening 9 or 10 (FIG. 4) and two such devices are secured to one another by the use of an accommodating nut (not shown) which joins them into a single unit.

Figure 5:
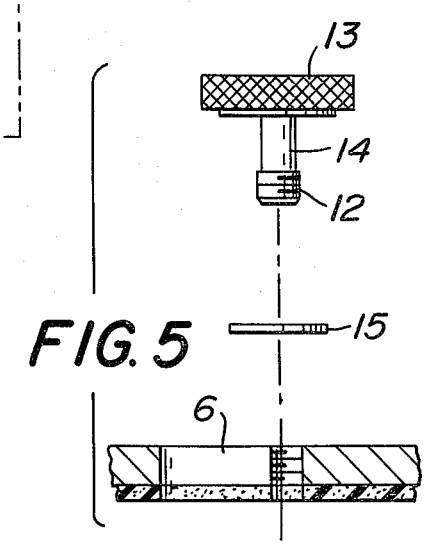
FIG. 5 is a side view of a threaded connector by which a camera is attached to the apparatus of FIG. 1. A portion of said apparatus is shown in cross section to illustrate the means by which this attachment is achieved.

Referring now in detail to FIG. 5 the screw assembly is shown to consist essentially of a shaft 14 having a threaded portion 12 on one end and, on its opposite end, an enlarged knurled head 13 so that it can be easily turned.

Said screw assembly moves slidingly within baseplate opening 5 (FIGS. 1 and 4) so that an attached camera or an attached piece of photographic equipment can be easily centered. This sliding movement is made possible as a result of the reduced diameter of the unthreaded shank 14 within said baseplate opening. Conversely, the diameter of the threaded portion 12 is larger than the diameter of said baseplate opening 5 so that said screw assembly will be slidingly retained within said opening and cannot be removed. A washer member 15 having a diameter larger than the diameter of unthreaded shank 14 but smaller than the diameter of threaded portion 12 is interposed between the underside of said baseplate and head 13 in a surrounding relationship. The washer may be rigid or flexible and it may be constructed of aluminum or plastic or any other material having a coefficient of friction lower than that of the baseplate and screw assembly with which it comes into contact.

The screw assembly described in the preceding paragraph is identical to the screw assembly 8 which engages opening 6 in baseplate 2 and both assemblies are identically operated.

The apparatus of this invention may be formed from discrete elements by joining together individual baseplate members 1 and 2 and connecting members 3 and 4 but a preferred aspect of this invention provides for the manufacture of an integrally formed device. For this purpose, any suitably rigid material may be used as, for example, plastic or a light weight metal such as 3/16 inch aluminum or aluminum alloy stock.

This invention has been described by reference to Drawings and specific embodiments; however, it will be understood by those skilled in the art that various modifications may be effected in the subject device without departing from the spirit or scope of this invention. Accordingly, any modifications which are within the skill of the artisan to effect should be considered as falling within the scope of the appended claims.

What is claimed is:

1. A camera-carrying device having a rectangularly shaped open body of one piece unitary construction in which the top and bottom portions thereof are identical, which comprises:
   (1) two facing baseplates each adapted for attachment to the bottom of a camera and each having an outer surface and an inner surface;
   (2) two connecting members which face one another each having an annular opening and each being joined to said baseplates at their respective end portions; and
   (3) means for releasably securing said baseplates to said camera, said means consisting essentially of a threaded screw movably mounted within a slotted opening in each baseplate so that the threaded portion thereof extends beyond said baseplate for threaded engagement with said camera.

2. The device according to claim 1 wherein said means consists essentially of a thumb screw having a threaded portion and an enlarged head portion for manual turning joined together by a smooth shank of reduced diameter, said screw being in sliding engagement with the opening in said baseplate.

3. The device according to claim 2 wherein said means includes a rigid washer member which surrounds said shank.

4. The device according to claim 1 wherein said screw is brought into threaded engagement with a tripod nut in said camera.

5. The device according to claim 1 wherein a cushioning layer of resilient material is affixed to the outer surface of said baseplates.

6. The device according to claim 5 wherein said cushioning layer is comprised of rubber.

7. The device according to claim 5 wherein said cushioning layer is a synthetic material.

8. The device according to claim 1 wherein two or more of said bodies are joined together in a side-by-side relationship to provide an apparatus having increased camera-carrying capabilities.

9. The device according to claim 8 wherein said bodies are joined to one another by a threaded bolt and an accommodating nut which releasably engages the annular openings in their respective connecting members.

10. The device according to claim 1 wherein a flexible strap attached to a secured camera is used as a support means.

* * * * *